United States Patent
Chung et al.

(10) Patent No.: US 7,074,842 B2
(45) Date of Patent: Jul. 11, 2006

(54) INKJET INK COMPOSITION

(75) Inventors: Chao-Jen Chung, North Wales, PA (US); Maureen Joanne Finley, Churchville, PA (US); Zhenwen Fu, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 123 days.

(21) Appl. No.: 10/349,896

(22) Filed: Jan. 23, 2003

(65) Prior Publication Data

US 2003/0176532 A1 Sep. 18, 2003

Related U.S. Application Data

(60) Provisional application No. 60/353,094, filed on Jan. 30, 2002.

(51) Int. Cl.
*C09D 11/10* (2006.01)
*C08L 39/00* (2006.01)
*B41J 2/01* (2006.01)
*B41J 2/435* (2006.01)

(52) U.S. Cl. .................. 523/160; 524/555; 347/102
(58) Field of Classification Search .............. 523/160, 523/161; 524/555; 347/100, 102
See application file for complete search history.

(56) References Cited

U.S. PATENT DOCUMENTS

| | | | | |
|---|---|---|---|---|
| 4,597,794 A * | 7/1986 | Ohta et al. | ................ | 347/100 |
| 5,085,698 A | 2/1992 | Ma et al. | ................ | 106/20 |
| 5,853,861 A | 12/1998 | Held | ................ | 428/207 |
| 5,859,113 A * | 1/1999 | McIntyre et al. | ........... | 524/460 |
| 6,031,019 A * | 2/2000 | Tsutsumi et al. | ........... | 523/160 |
| 6,541,538 B1 * | 4/2003 | Matzinger et al. | .......... | 523/160 |
| 6,645,280 B1 * | 11/2003 | Zhu et al. | ................ | 106/31.27 |
| 6,727,318 B1 * | 4/2004 | Mathauer et al. | ........... | 524/801 |
| 2004/0196347 A1 * | 10/2004 | Redding et al. | ............ | 347/100 |

FOREIGN PATENT DOCUMENTS

| | | |
|---|---|---|
| DE | 196 45 427 A1 | 5/1998 |
| EP | 0 885 906 A2 | 6/1998 |
| JP | 8059932 A2 | 3/1996 |
| JP | 10-120952 | 5/1998 |

OTHER PUBLICATIONS

Olivia Y. Tian, Encad Inc., San Diego, California, USA and Wayne C. Tincher, Georgia Institute of Technology, Atlanta, Georgia, USA; "Pigmented Latex System for Ink Jet Printing on Textile"; IS&Ts NIP 15: 1999 International Conference on Digital Printing Technologies, pp. 196-199.

Wayne C. Tincher and Ruxim Yang, Georgia Institute of Technology, Atlanta, Georgia, USA; "Ink Jet Resin-Pigment Printing of Silk Fabrics"; IS&Ts NIP 15: 1999 International Conference on Digital Printing Technologies, pp. 200-202.

G.L. Talak et al., Thermosetting Acrylic Emulsions, *Paint & Resins*, pp. 34,35,37 and 49 (Dec. 1983).

* cited by examiner

*Primary Examiner*—Callie Shosho
(74) *Attorney, Agent, or Firm*—Karl Stauss

(57) ABSTRACT

An inkjet ink binder composition including an emulsion polymer, the polymer including as polymerized units 1–10%, by weight based on dry polymer weight, of a monomer selected from the group consisting of methylol acrylamide, methylol methacrylamide, methyl acrylamidoglycolate methyl ether, acrylamidoglycolic acid, and mixtures thereof is provided. An inkjet ink composition including the emulsion polymer, a liquid medium, and a pigment and a method for improving the durability of inkjet ink printed on a substrate are also provided.

6 Claims, No Drawings

INKJET INK COMPOSITION

CROSS REFERENCE TO RELATED PATENT APPLICATIONS

This is a non-provisional application of prior pending U.S. provisional application Ser. No. 60/353,094 filed Jan. 30, 2002.

This invention relates to an ink binder composition. In particular, this invention relates to an inkjet ink binder including an emulsion polymer, the polymer including as polymerized units 1–10%, by weight based on dry polymer weight, of a first monomer selected from the group consisting of methylol acrylamide, methylol methacrylamide, methyl acrylamidoglycolate methyl ether, acrylamidoglycolic acid, and mixtures thereof. The invention is also related to an inkjet ink composition comprising a liquid medium, a pigment, and the inkjet binder. And the invention relates to a method for improving the durability of the inkjet ink printed on a substrate.

O. Y. Tian and W. C. Tincher, "Pigmented Latex System for Ink Jet Printing on Textile", Proceedings of IS&T NIP 15: 1999 International Conference on Digital Printing Technologies, 196–199 (1999) discloses small particle size polymer latex systems in ink jet printing on textile substrates, including "curing" to evaporate water and form an integrated polymer film.

It is desired to provide inkjet inks including a binder capable of crosslinking and providing improved durability, such as washfastness, to the print on a substrate, such as a textile.

In a first aspect of the present invention there is provided an inkjet ink binder composition comprising an emulsion polymer, said polymer comprising as polymerized units 1–10%, by weight based on dry polymer weight, of a first monomer selected from the group consisting of methylol acrylamide, methylol methacrylamide, methyl acrylamidoglycolate methyl ether, acrylamidoglycolic acid, and mixtures thereof.

In a second aspect of the present invention there is provided an inkjet ink composition comprising a liquid medium, a pigment, and an emulsion polymer, said polymer comprising as polymerized units 1–10%, by weight based on dry polymer weight, of a first monomer selected from the group consisting of methylol acrylamide, methylol methacrylamide, methyl acrylamidoglycolate methyl ether, acrylamidoglycolic acid, and mixtures thereof.

In a third aspect of the present invention there is provided a method for improving the durability of inkjet ink printed on a substrate comprising: (a) forming an inkjet ink composition comprising a liquid medium, a pigment, and an emulsion polymer, said polymer comprising as polymerized units 1–10%, by weight based on dry polymer weight, of a first monomer selected from the group consisting of methylol acrylamide, methylol methacrylamide, methyl acrylamidoglycolate methyl ether, acrylamidoglycolic acid, and mixtures thereof; (b) disposing said composition on a substrate; and c) curing said composition.

The inkjet ink binder composition includes an emulsion polymer including, as polymerized units, 1–10%, preferably 3–8%, more preferably 4–7%, by weight based on dry polymer weight, of a first monomer selected from the group consisting of methylol acrylamide, methylol methacrylamide, methyl acrylamidoglycolate methyl ether, acrylamidoglycolic acid, and mixtures thereof. By "emulsion polymer" herein is meant an emulsion-polymerized addition polymer. The emulsion polymer also contains, as polymerized units, one or more monomers which may be selected from monoethylenically-unsaturated monomers such as, for example, (meth)acrylic ester monomer including methyl (meth)acrylate, ethyl (meth)acrylate, butyl (meth)acrylate, 2-ethylhexyl (meth)acrylate, decyl (meth)acrylate, lauryl (meth)acrylate, stearyl (meth)acrylate, hydroxyethyl (meth) acrylate, hydroxypropyl (meth)acrylate, aminoalkyl (meth) acrylate, N-alkyl aminoalkyl (meth)acrylate, N,N-dialkyl aminoalkyl (meth)acrylate; N-alkoxyethyl (meth)acrylate; urieido (meth)acrylate; (meth)acrylonitrile; (meth)acrylamide; styrene or alkyl-substituted styrenes; butadiene; ethylene; vinyl ester monomer such as, for example, vinyl acetate, vinyl propionate, vinyl butyrate, vinyl 2-ethyl hexanoate, vinyl laurate, vinyl pivalate, 1-methylvinyl acetate, and vinyl esters of branched carboxylic acids having 5–12 carbon atoms (as vinyl versatate); vinyl chloride, vinylidene chloride, and N-vinyl pyrollidone; allyl (meth)acrylate, diallyl phthalate, ethylene glycol di(meth)acrylate, 1,3-butylene glycol di(meth)acrylate, 1,6-hexanediol di(meth)acrylate, and divinyl benzene; (meth)acrylic acid, crotonic acid, itaconic acid, vinyl sulfonic acid, 2-acrylamidopropane sulfonate, sulfoethyl methacrylate, phosphoethyl methacrylate, fumaric acid, maleic acid, monomethyl itaconate, monomethyl fumarate, monobutyl fumarate, and maleic anhydride. The use of the term "(meth)" followed by another term such as acrylate, acrylonitrile, or acrylamide, as used throughout the disclosure, refers to both acrylate, acrylonitrile, or acrylamide and methacrylate, methacrylonitrile, and methacrylamide, respectively.

In a preferred embodiment the emulsion polymer includes, as polymerized units, 1–10%, by weight based on dry polymer weight, of a first monomer selected from the group consisting of methylol acrylamide, methylol methacrylamide, methyl acrylamidoglycolate methyl ether, acrylamidoglycolic acid, and mixtures thereof, 99–71%, by weight based on dry polymer weight, of one or more second monomer(s) having a weight-averaged water solubility of less than 1.8% by weight; and from 0–19%, by weight based on dry polymer weight, of one or more third monomer(s) each having a water solubility of greater than 6% by weight. The second and third monomers exclude the first monomers methylol acrylamide, methylol methacrylamide, methyl acrylamidoglycolate methyl ether, and acrylamidoglycolic acid. By "water solubility" herein is meant, the solubility in water at 25° C. By "weight-averaged water solubility" herein is meant that when more than one second monomer is selected the water solubility is calculated by adding, for each second monomer, the products of its water solubility and its weight fraction based on the total weight of the second monomers. The solubility of monomers in water is known. For example, data are available in Polymer Handbook (Second edition, J. Brandrup, E. H. Immergut, Editors, John Wiley & Sons) and also in Merck Index (Eleventh Edition, Merck & Co., Inc. (Rahway, N.J., U.S.A.). Data for typical monomers are shown below

| Monomer | Solubility in water (%, 25° C.) |
|---|---|
| Methyl methacrylate | 1.35 |
| Ethyl methacrylate | 0.46 |
| Butyl methacrylate | 0.03 |
| Ethyl acrylate | 2.0 (20° C.) |
| 2-Ethylhexyl acrylate | 0.01 |
| 2-Hydroxyethyl methacrylate | complete |
| Styrene | 0.029 |
| Acrylonitrile | 7.30 |

-continued

| Monomer | Solubility in water (%, 25° C.) |
|---|---|
| Vinyl acetate | 2.3 |
| Acrylamide | 20.4 |

The polymerization processes which may be used to prepare the emulsion polymer are well known. Conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Alternatively, a protective colloid such as, for example, polyvinyl alcohol, partially acetylated polyvinyl alcohol, hydroxyethyl cellulose, hydroxymethyl cellulose, hydroxypropyl cellulose, poly N-vinyl pyrollidone, carboxymethyl cellulose, and gum arabic, may be used in the emulsion polymerization, either exclusively or in conjuction with a surfactant. The reaction temperature is typically maintained at a temperature lower than 100° C. throughout the course of the reaction. Preferred is a reaction temperature between 30° C. and 95° C., more preferably between 50° C. and 90° C. A thermal or redox initiation process may be used. The monomer mixture may be added neat or as an emulsion in water. The monomer mixture may be added in one or more additions or continuously, linearly or not, over the reaction period, or combinations thereof.

Further, a chain transfer agent such as, for example, isopropanol, halogenated compounds, n-butyl mercaptan, n-amyl mercaptan, n-dodecyl mercaptan, t-dodecyl mercaptan, alkyl thioglycolate, mercaptopropionic acid, and alkyl mercaptoalkanoate in an amount of 0 to 5% by weight based on monomer weight may be used to regulate the molecular weight of the emulsion polymer.

In an alternative embodiment of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may include the monomers, surfactants, protective colloid, redox initiation system, chain transfer agents, etc. as disclosed herein-above for the emulsion polymer. In the case of a multi-staged polymer particle the composition for the purpose of this invention is to be calculated herein using the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

The emulsion polymer has an average particle diameter from 20 to 1000 nanometers, preferably from 70 to 300 nanometers as determined using a Brookhaven Model BI-90 particle sizer manufactured by Brookhaven Instruments Corporation, Holtsville N.Y., reported as "effective diameter". Also contemplated are multimodal particle size emulsion polymers wherein two or more distinct particle sizes or very broad distributions are provided as is taught in U.S. Pat. Nos. 5,340,858; 5,350,787; 5,352,720; 4,539,361; and 4,456,726.

The glass transition temperature ("Tg") of the emulsion polymer is typically from −50° C. to 100° C., the monomers and amounts of the monomers selected to achieve the desired polymer Tg range being well known in the art. Tgs used herein are those calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(\text{calc.}) = w(M1)/Tg(M1) + w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in °K.

The glass transition temperatures of homopolymers may be found, for example, in "Polymer Handbook", edited by J. Brandrup and E. H. Immergut, Interscience Publishers.

The emulsion polymer may be prepared by batch, semi-batch, gradual addition, or continuous processes, as are well known to those skilled in the art.

The inkjet ink composition includes a liquid medium, a pigment, and the emulsion polymer.

The inkjet ink composition includes a liquid medium which is typically predominantly water, preferably deionized water.

The inkjet ink composition includes a pigment. The pigment may be an organic pigment or an inorganic pigment. By "organic pigment" herein is meant a pigment which is predominantly an organic compound or mixture of organic compounds, explicitly including carbon black.

Suitable organic pigments include, for example, anthroquinones, phthalocyanine blues, phthalocyanine greens, diazos, monoazos, heterocyclic yellows, pyranthrones, quinacridone pigments, dioxazine pigments, indigo, thioindigo pigments, perynone pigments, perylene pigments, isoindolene, polymer particles having at least one void, and the like. Carbon black is the generic name for small particle size carbon particles formed in the gas phase by the thermal decomposition of hydrocarbons and includes, for example, materials known in the art as furnace black, lampblack, channel black, acetylene black. Carbon black additionally encompasses treated, modified, and oxidized cabon black. Suitable inorganic pigments include titanium dioxide, iron oxide, and other metal powders. Generally, the amount of pigment(s) used is less than 20%, preferably 3–8%, by weight based on the total weight of the ink. The pigment particle size must be sufficiently small that pigment particles will not clog the nozzles on the printing device in which the ink is to be used. Typical nozzle openings on ink jet printers are 20–60 microns in diameter. Preferably, the pigment particle size is from 0.02 to 2, more preferably from 0.02 to 1, most preferably from 0.02 to 0.3 microns in diameter.

The ink composition of the present invention preferably includes the emulsion polymer at a level of 0.1 to 25%, more preferably 1 to 20%, by weight based on the total weight of the ink composition. The ink composition may also include water miscible or soluble materials such as humectants, dispersants, penetrants, chelating agents, co-solvents, defoamers, buffers, biocides, fungicides, viscosity modifiers, bactericides, surfactants, anti-curling agents, anti-bleed agents and surface tension modifiers, all as is known in the art. Useful humectants include ethylene glycol, 1,3 propanediol, 1,4 butanediol, 1,4 cyclohexanedimethanol, 1,5 pentanediol, 1,6 hexanediol, 1,8 octanediol, 1,2 propanediol, 1,2 butanediol, 1,3 butanediol, 2,3 butanediol, diethylene glycol, triethylene glycol, tetraethylene glycol, polyethylene glycol with average molecular weight of 200, 300, 400, 600, 900, 1000, 1500 and 2000, dipropylene glycol, polyproylene glycol with average molecular weight of 425, 725, 1000, and 2000, 2-pyrrolidone, 1-methyl-2-pyrrolidone, 1-methyl-2-piperidone, N-ethylacetamide, N-methlpropionamide, N-acetyl ethanolamine, N-methylacetamide, formamide, 3-amino-1, 2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, pantothenol, Liponic EG-1. Preferred humectants are polyethylene glycol with average molecular weight of 400 to 1000, 2-pyrrolidone 2,2 thiodiethanol, and 1,5 pentanediol. Preferred penetrants include n-propanol, isopropyl alcohol, 1,3-propanediol, 1,2 hexanediol, and hexyl carbitol.

The amount of humectant used is determined by the properties of the ink and may range from 1–30%, preferably 5–15%, by weight, based on the total weight of the ink. Examples of commonly used humectants useful in forming the ink are: glycols, polyethylene glycols, glycerol, ethanolamine, diethanolamine, alcohols, and pyrrolidones. Other humectants known in the art may be used as well.

The use of suitable penetrants will depend on the specific application of the ink. Useful examples include pyrrolidone, and N-methyl-2-pyrrolidone.

In a preferred embodiment in a inkjet ink composition containing more than 20%, on an equivalents basis, of hydroxy, amino, or thiol functionality relative to the hydroxy functionality of the emulsion polymer, the hydroxy, amino, or thiol functionality being present in, for example, penetrants, humectants, surfactants, etc., that such ingredients have a boiling point less than 220° C., preferably less than 200° C.

The amount of defoaming agent in the ink will typically range from 0–0.5% by weight, based on the total weight of the ink. Defoaming agents useful in forming aqueous dispersions of pigments are well known in the art and commercially available examples include Surfynol 104H and Surfynol DF-37 (Air Products, Allentown, Pa.).

In a preferred embodiment, particularly in those embodiments wherein methylol acrylamide or methylol methacrylamide is included in the copolymer, a catalyst which is a latent source of acidity, that is, a compound effective to lower the pH of the coating composition under the drying and curing conditions disclosed below, is included in the coating composition, preferably in an amount effective to provide a coating composition having a pH from about 1 to about 4.

The catalyst, which may be used at a level of 0 to 10%, preferably 0.1% to 10%, more preferably 0.5% to 6%, most preferably 3% to 6%, by weight based on the weight of the ink composition includes, for example, ammonium chloride, ammonium nitrate, ammonium citrate, diammonium phosphate, magnesium chloride, amine salts of p-toluene sulfonic acid and mixtures thereof.

The ink compositions of the present invention may be prepared by any method known in the art for making such compositions, for example, by mixing, stirring or agitating the ingredients together using any art recognized technique to form an aqueous ink. The procedure for preparation of the ink composition of the present invention is not critical except to the extent that the ink composition is homogenous.

The ink composition of the present invention is applied by one of the inkjet techniques known in the art using, for example, thermal or bubble jet printers, piezoelectric printers, continuous flow printers, air brush or valve jet printers, to a substrate. Preferred substrates are fabrics, either woven or nonwoven, which may be formed from suitable fibers such as, for example, cotton, polyester, aramid, silk, acrylic, wool, rayon, nylon, polyamide, and glass. The ink composition is then cured, i.e., dried and crosslinked, at a selected time and temperature, times from 1 second to 10 minutes and temperatures from 60° C. to 300° C. being typical. It is understood that shorter cure times will ordinarily require higher temperatures to effect cure. The cure may be effected by combinations of thermal and radiation energy, such as microwave or infrared radiation.

Test Methods

Determination of Swell Ratio. 25 grams of the test material was poured into a 100 mm diameter petri dish and dried at 50° C. for 7 days. The films were cured at 150° C. for 9 minutes. A piece of the cured film was weighed and immersed in acetone for 24 hours. The swelled film was dried by padding it with paper tissues with care to only remove free acetone. The swelled film was weighed. The swell ratio was calculated as the ratio of the weight of swelled film over the weight of the film before swell.

Ink Jet Print Durability. Cured print samples were subjected to the accelerated 3A wash test of AATCC Test Method 61-1996. A rating of 5 means there is almost no color loss after wash and a rating of 1 means very significant color loss after wash.

The abbreviations listed below are used throughout the examples.

| | |
|---|---|
| MA = | Methyl acrylate |
| BA = | Butyl acrylate |
| EA = | Ethyl acrylate |
| AN = | Acrylonitrile |
| EHA = | 2-Ethylhexyl methacrylate |
| BMA = | Butyl methacrylate |
| IA = | Itaconic acid |
| MLAM = | N-methylolacrylamide |
| AM = | Acrylamide |
| DI water = | DI water |

The following examples are illustrative of the invention.

EXAMPLE 1

Preparation of Emulsion Polymer Containing 4% MLAM

A 5-liter round-bottomed flask was equipped with paddle stirrer, thermometer, nitrogen inlet and reflux condenser. To 814.5 g DI water heated to 75° C. in the flask under a nitrogen atmosphere with stirring was added 10.5 g 0.1% $FeSO_4 \cdot 7H_2O$ followed by 105 g monomer emulsion which was prepared from 401 g DI water, 150 g TRITON™ X-405, 521.6 g BA, 799.8 g EA, 73.65 g AN, 123.59 g MLAM (48%) and 13.27 g AM dissolved in 13.27 g DI water. 0.75 g ammonium persulfate dissolved in 22.5 g water was added to the flask and then 0.6 g sodium bisulfite and 0.15 g sodium hydrosulfite dissolved in 22.5 g water. Two minutes later, the remaining monomer emulsion with addition of 15 g itaconic acid dissolved in 300 g water was added to the kettle over 90 minutes at 73° C. During the feed time, 6.75 g ammonium persulfate dissolved in 75 g water and 6.75 g sodium bisulfite dissolved in 75 g water were also added to the kettle. Thirty minutes after the monomer addition, 4.28 g t-butyl hydroperoxide (70%) dissolved in 48.25 g water and 2.145 g sodium formaldehyde sulfoxylate dissolved in 55.5 g water were gradually added to the kettle. Thirty minutes after the addition, 4.28 g t-butyl hydroperoxide (70%) dissolved in 48.25 g water and 2.92 g isoascorbic acid dissolved in 55.5 g water were gradually added to the kettle. The emulsion polymer was then neutralized with 3.0 g of 14% ammonia at a temperature below 45° C.

EXAMPLE 2

Preparation of Emulsion Polymer Containing 6% MLAM

A 5-liter round-bottomed flask was equipped with paddle stirrer, thermometer, nitrogen inlet and reflux condenser. To 1043 g DI water heated to 75° C. in the flask under a nitrogen atmosphere with stirring there was added 7 g 0.1% $FeSO_4 \cdot 7H_2O$ followed by 70 g monomer emulsion which was prepared from 280 g DI water, 100 g TRITON™ X-405, 347.73 g BA, 522.33 g EA, 49.1 g AN and 82.39 g MLAM (48%) dissolved in 13.27 g DI water. 0.5 g ammonium persulfate dissolved in 15 g water was added to the flask and then 0.4 g sodium bisulfite and 0.1 g sodium hydrosulfite dissolved in 15 g water. Two minutes later, the remaining monomer emulsion with addition of 10 g itaconic acid dissolved in 700 g water and 41.2 g MLAM (48%) was added to the kettle over 90 minutes at 73° C. During the feed time, 4.5 g ammonium persulfate dissolved in 50 g water and 4.5 g sodium bisulfite dissolved in 50 g water were also added to the kettle. Thirty minutes after the monomer addition, 2.85 g t-butyl hydroperoxide (70%) dissolved in 35.5 g water and 1.43 g sodium formaldehyde sulfoxylate dissolved in 37 g water were gradually added to the kettle. Thirty minutes after the addition, 2.85 g t-butyl hydroperoxide (70%) dissolved in 35.5 g water and 1.95 g isoascorbic acid dissolved in 37 g water were gradualy added to the kettle. The emulsion polymer was then neutralized with 2.0 g 14% ammonia at a temperature below 45° C.

EXAMPLE 3

Preparation of Emulsion Polymer Containing 8% MLAM

An emulsion polymer was prepared according to Example 2, except that the amount of MLAM added to the remaining monomer emulsion was increased to 82.39 g.

EXAMPLE 4

Preparation of Emulsion Polymer Containing 2.84% MLAM

An emulsion polymer was prepared according to Example 1, except that the amount of MLAM in the monomer emulsion was reduced to 87.75 g.

EXAMPLE 5

Evaluation of Swell Ratio

Swell ratios of cured films were determined. Formulations for swell ratio determination are study are listed in Table 5.1. 1B through 4B are dilutions of the emulsion polymers and 1A to 4A are corresponding dilutions with the addition of 1,3-propanediol at 1:1 weight ratio to the polymer content. All formulations were at 22.5 wt % solids. Good films were obtained with formulations without 1,3-propanediol. For formulations with 1,3-propanediol, films were only formed on the surface and they were still fluid under the surface. In those cases the films on the surface were used in the swell ratio test method disclosed herein. Swell ratios are presented in Table 5.2.

TABLE 5.1

Formulations for Swell Ratio Determination

| Sample ID | Emulsion Polymer of Ex. | Emulsion Polymer. (g) | 1,3 Propanediol. (g) | Water (g) |
|---|---|---|---|---|
| 1A | 4 | 50.00 | 21.27 | 23.26 |
| 2A | 1 | 50.00 | 21.37 | 23.59 |
| 3A | 2 | 50.00 | 14.76 | 0.84 |
| 4A | 3 | 50.00 | 14.63 | 0.39 |
| 1B | 4 | 50.00 | 0.00 | 44.53 |
| 2B | 1 | 50.00 | 0.00 | 44.96 |
| 3B | 2 | 50.00 | 0.00 | 15.60 |
| 4B | 3 | 50.00 | 0.00 | 15.02 |

TABLE 5.2

Swell Ratios

| Sample ID | Swell Ratio |
|---|---|
| 1A | * |
| 2A | 17.6 |
| 3A | 14.0 |
| 4A | 8.4 |
| 1B | 5.4 |
| 2B | 4.3 |
| 3B | 3.6 |
| 4B | 2.9 |

* The film (1A) did not have enough integrity after swell to measure the swell ratio. It was estimated to be greater than 20.

Compositions of this invention containing the emulsion polymers of Examples 1–4 exhibit crosslinking. The data shows that propanediol lessens the cure; glycols and glycerol and their derivatives are commonly used in ink jet ink formulations. In such formulations, higher levels of crosslinking monomers such as N-methylolacrylamide are needed to achieve similar properties.

EXAMPLE 6

Evaluation of Print Durability

Ink jet ink formulations, surface tension, and viscosity are given in Tables 6.1 and 6.2. These inks were printed on both 100% cotton and 50%cotton/50%polyester knitted fabrics with an EPSON stylus 3000 color printer. These printed fabrics were cured at various times and temperatures.

TABLE 6.1

Ink Formulations

| Ingredient ID\ Formulation ID | 1C | 2C | 3C | 4C |
|---|---|---|---|---|
| Cyan Pigment (20% by Wt.) | 17.50 | 17.50 | 17.50 | 17.50 |
| Ex. 4 emulsion polymer | 32.91 | | | |
| Ex. 1 emulsion polymer | | 32.76 | | |
| Ex. 2 emulsion polymer | | | 47.43 | |
| Ex. 3 emulsion polymer | | | | 47.85 |
| 25% NH4NO3 | 3.36 | 3.36 | 3.36 | 3.36 |
| N-methylpyrrolidone | 6.50 | 6.50 | 6.50 | 6.50 |
| Polyethylene glycol PEG-600 | | | | |
| EG-7 | 1.00 | 1.00 | 1.00 | 1.00 |
| Dynol 604 | 0.50 | 0.50 | 0.50 | 0.50 |
| 1,3-propanediol | 10.20 | 10.20 | 10.20 | 10.20 |
| DI water | 28.03 | 28.18 | 13.51 | 13.09 |
| Total ink | 100.00 | 100.00 | 100.00 | 100.00 |

TABLE 6.2

Surface Tension and Viscosity of inks.

| ID | Surface Tension (Dyne/cm) | Viscosity (centipoise) |
|---|---|---|
| 1C | 31.90 | 4.37 |
| 2C | 30.90 | 4.59 |
| 3C | 32.10 | 4.74 |
| 4C | 31.90 | 5.79 |

Tables 6.3, 6.4 and 6.5 present the 3A wash results of the prints cured at 180, 190 and 200° C., respectively, for various cure times.

TABLE 6.3

3A Wash Results for Samples Cured at 180° C.

| | Substrate | | | | | |
|---|---|---|---|---|---|---|
| | Cotton | | | 50 cotton/50 polyester | | |
| | Cure Temp. (° C.) | | | | | |
| | 180 | 180 | 180 | 180 | 180 | 180 |
| | Cure Time | | | | | |
| | 36 sec | 1 min | 2 min | 36 sec | 1 min | 2 min |
| 1C | 2.00 | 3.00 | 3.00 | 2.00 | 2.50 | 3.50 |
| 2C | 1.75 | 4.00 | 3.50 | 2.25 | 3.50 | 3.75 |
| 3C | 1.75 | 2.75 | 3.50 | 3.00 | 3.50 | 3.75 |
| 4C | 2.00 | 3.25 | 3.50 | 3.00 | 3.50 | 4.00 |

TABLE 6.4

3A Wash Results for Samples Cured at 190° C.

| | Substarte | | | | | | | |
|---|---|---|---|---|---|---|---|---|
| | Cotton | | | | 50 cotton/50 polyester | | | |
| | Cure Temp. (° C.) | | | | | | | |
| | 190 | 190 | 190 | 190 | 190 | 190 | 190 | 190 |
| | Cure Time | | | | | | | |
| | 36 sec | 1 min | 2 min | 3 min | 36 sec | 1 min | 2 min | 3 min |
| 1C | 1.75 | 3.00 | 3.50 | 3.75 | 2.00 | 4.00 | 4.25 | 4.25 |
| 2C | 1.75 | 3.25 | 4.00 | 4.00 | 2.25 | 4.00 | 4.25 | 4.25 |
| 3C | 1.75 | 4.25 | 4.00 | 4.00 | 2.50 | 3.25 | 4.25 | 4.25 |
| 4C | 2.50 | 4.50 | 4.00 | 4.50 | 4.00 | 4.25 | 4.25 | 4.25 |

TABLE 6.5

3A Wash Results for Samples Cured at 200° C.

| | Substarte | | | | | |
|---|---|---|---|---|---|---|
| | Cotton | | | 50 cotton/50 polyester | | |
| | Cure Temp. (° C.) | | | | | |
| | 200 | 200 | 200 | 200 | 200 | 200 |
| | Cure Time | | | | | |
| | 36 sec | 1 min | 2 min | 36 sec | 1 min | 2 min |
| 1C | 1.75 | 3.50 | 4.50 | 2.25 | 4.25 | 4.25 |
| 2C | 2.00 | 4.25 | 4.50 | 2.50 | 4.25 | 4.25 |
| 3C | 2.50 | 4.50 | 4.50 | 3.50 | 4.25 | 4.25 |
| 4C | 2.50 | 4.00 | 4.50 | 3.50 | 4.25 | 4.25 |

Prints formed from ink jet ink compositions 1C–4C of this invention exhibit good to excellent wash durability. For shorter time and lower temperature cure conditions, the use of emulsion polymers containing higher levels of cross linkers such as N-methylolacrylamide enhances the print wash colorfastness property.

EXAMPLE 7

Preparation and Evaluation of Emulsion Polymers of Various Compositions

Example 7–1 was prepared by the following procedure: A 5-L round-bottomed flask was equipped with paddle stirrer, thermometer, nitrogen inlet and reflux condenser. To 814.5 g. DI water heated to 75° C. in the flask under a nitrogen atmosphere with stirring there was added 10.5 g 0.1% $FeSO_4.7H_2O$ followed by 105 g of monomer emulsion which was prepared from 420 g DI water, 150 g TRITON™ X-405, 538.8 g BA, 799.8 g EA, 73.65 g. of acrylonitrile, 87.75 g MLAM (48%) and 13.27 g AM dissolved in 13.27 g DI water. 0.75 g ammonium persulfate dissolved in 22.5 g water was added to the flask and then 0.6 g sodium bisulfite and 0.15 g sodium hydrosulfite dissolved in 22.5 g water. Two minutes later, the remaining monomer emulsion with addition of 15 g IA dissolved in 300 g water was added to the kettle over 90 minutes period at 73° C. During the feed time, 6.75 g ammonium persulfate dissolved in 75 g water and 6.75 g sodium bisulfite dissolved in 75 g water were also added to the kettle. Thirty minutes after the monomer addition, 4.28 g t-butyl hydroperoxide (70%) dissolved in 48.25 g water and 2.145 g sodium formaldehyde sulfoxylate dissolved in 55.5 g water were added to the kettle over 15 minutes. Thirty minutes after the addition, 4.28 g t-butyl hydroperoxide (70%) dissolved in 48.25 g water and 2.92 g isoascorbic acid dissolved in 55.5 g water were added to the kettle over 30 minutes. The emulsion polymer was then neutralized with 3.0 g ammonia (14%) at a temperature below 45° C.

Examples 7–2 to 7–6 were prepared following the procedure of the example 7–1 except the amount of the monomers was altered to provide the compositions as presented in the table below (in parts by wt.):

TABLE 7.1

Compositions of Emulsion Polymers 7-1 to 7-6

| | |
|---|---|
| Ex. 7-1 | 53.9EA/36.3BA/5.0AN/2.8MLAM/0.9AM/1.0IA |
| Ex. 7-2 | 71.9EA/18.3BA/5.0AN/2.8MLAM/0.9AM/1.0IA |
| Ex. 7-3 | 90.3EA/5.0AN/2.8MLAM/0.9AM/1.0IA |
| Ex. 7-4 | 71.9EA/18.3EHA/5.0AN/2.8MLAM/0.9AM/1.0IA |
| Ex. 7-5 | 71.9EA/18.3BMA/5.0AN/2.8MLAM/0.9AM/1.0IA |
| Ex. 7-6 | 71.9EA/18.3MA/5.0AN/2.8MLAM/0.9AM/1.0IA |

Emulsion filterability. Emulsion polymers of examples 7–1 to 7–6 were diluted to 30% solids with DI water. 50 ml of the sample was passed through a 1μ filter; results are shown in Table 7.2.

TABLE 7.2

Emulsion Filterability Results

| Example | 1μ filter |
|---|---|
| 7-1 | pass |
| 7-2 | pass |
| 7-3 | fail |
| 7-4 | pass |
| 7-5 | pass |
| 7-6 | fail |

Ink jet ink compositions were prepared as presented in Table 7.3.

TABLE 7.3

InkJet ink compositions

| InkJet Ink Formulation | 7A | 7B | 7C | 7D |
|---|---|---|---|---|
| Cyan Pigment (20% by Wt.) | 21.25 | 21.25 | 21.25 | 21.25 |
| Ex. 7-1 emulsion polymer | 39.96 | | | |
| Ex. 7-4 emulsion polymer | | 40.39 | | |
| Ex. 7-5 emulsion polymer | | | 39.81 | |
| Ex. 7-6 emulsion polymer | | | | 40.13 |
| 25% NH4NO3 | 3.36 | 3.36 | 3.36 | 3.36 |
| N-methylpyrrolidone | 6.50 | 6.50 | 6.50 | 6.50 |
| EG-7 | 1.00 | 1.00 | 1.00 | 1.00 |
| Dynol 604 | 0.50 | 0.50 | 0.50 | 0.50 |
| 1,3-propanediol | 10.20 | 10.20 | 10.20 | 10.20 |
| DI water | 17.23 | 16.80 | 17.38 | 17.06 |
| Total ink | 100.00 | 100.00 | 100.00 | 100.00 |

The ink viscosity, surface tension, initial particle size and heat-aged (60° C./1 week) particle size are shown in Table 7.4.

| Ink | Viscosity (cps) | Surface Tension (dyne/cm) | Particle size (μ) Initial | Particle size (μ) after 1 week at 60° C. |
|---|---|---|---|---|
| 7A | 5.72 | 34.3 | 0.18 | 0.27 |
| 7B | 6.36 | 34.3 | 0.18 | 0.28 |
| 7C | 6.18 | 31.7 | 0.18 | 0.35 |
| 7D | 7.0 | 30.3 | 0.19 | gel |

The data show that emulsion polymers 7–1, 7–2, 7–4, and 7–5 having a preferred composition easily filter through 1μ filter. Inks containing emulsion polymers 7–1, 7–4, and 7–5 having a preferred composition are stable after heat-aging.

EXAMPLE 8

Preparation and Evaluation of Various Inkjet Ink Compositions

Inkjet ink compositions were prepared according to Table 8.1. 100% cotton fabric tee shirts and a 50% cotton/50% polyester fabric tee shirts by Gildan, from Bodek and Rhodes Printable Tee Shirts (Philadelphia, Pa.) were printed with a EPSON Stylus 3000 Color Printer under the high quality printing mode for plain paper. Samples were cured as indicated in Table 8.3 and 8.4 and washed according to AATCC TEST METHOD 61–1996 from the 2000 technical manual of the American Association of Textile Chemists and Colorists, page 88–92; higher ratings are better.

TABLE 8.1

Ink compositions incorporating various humectants.

| | Boiling Point ° C. | 8A | 8B | 8C |
|---|---|---|---|---|
| Cyan Pigment (20% by Wt.) | | 17.50 | 17.50 | 17.50 |
| Ex. 7-4 emulsion polymer | | 32.9 | 32.9 | 32.9 |
| 25% NH4NO3 | | 3.36 | 3.36 | 3.36 |
| NMP | | 6.50 | 6.50 | 6.50 |
| EG-7 | | 1.00 | 1.00 | 1.00 |
| Dynol 604 | | 0.50 | 0.50 | 0.50 |
| 1,3-propanediol | 214 | 10.20 | | |
| 1,2-propanediol | 187 | | 10.20 | |
| diethylene glycol monomethyl ether | 194 | | | 10.20 |
| DI water | | 28.0 | 28.1 | 28.0 |
| Total ink | | 100. | 100. | 100. |

TABLE 8.2

Surface Tension and Viscosity of Inks

|    | Surface Tension (dyne/cm) | Viscosity (centipoise) |
|----|---------------------------|------------------------|
| 8A | 32.30                     | 4.42                   |
| 8B | 33.10                     | 5.28                   |
| 8C | 32.30                     | 5.30                   |

TABLE 8.3

3A Wash Results for Cured Printed Samples

| | Substrate Cotton | | | |
|---|---|---|---|---|
| | Cure Temperature (° C.) | | | |
| | 180 | 180 | 180 | 185 |
| | Cure Time | | | |
| | 36 sec | 1 min | 2 min | 1 min |
| 8A | 2.50 | 2.50 | 2.50 | 3.00 |
| 8B | 2.50 | 4.50 | 4.50 | 4.50 |
| 8C | 2.50 | 4.25 | 3.50 | 4.25 |

TABLE 8.4

3A Wash Results for Cured Printed Samples

| | Substrate Cotton | | | | |
|---|---|---|---|---|---|
| | Cure Temperature (° C.) | | | | |
| | 190 | 190 | 190 | 200 | 200 |
| | Cure Time | | | | |
| | 36 sec | 1 min | 2 min | 36 sec | 1 min |
| 1D | 1.50 | 2.00 | 3.50 | 1.00 | 2.50 |
| 2D | 2.00 | 2.50 | 4.00 | 2.00 | 4.50 |
| 3D | 3.50 | 3.50 | 4.25 | 2.00 | 4.50 |

These data show that a hydroxy-functional humectant having a boiling point lower than 200° C. enhances print wash colorfastness relative to a humectant having a boiling point greater than 200° C.

What is claimed is:

1. An inkjet ink composition comprising
   (a) a liquid medium;
   (b) a pigment;
   (c) an emulsion polymer, said polymer comprising as polymerized units 1–10%, by weight based on dry polymer weight, of a first monomer selected from the group consisting of methylol acrylamide, methylol methacrylamide, methyl acrylamidoglycolate methyl ether, acrylamidoglycolic acid, and mixtures thereof; and
   (d) a latent acid catalyst composition at 0.1% to 10% by weight of the inkjet ink, wherein the latent acid catalyst composition is selected from the group consisting of ammonium chloride, animonium nitrate, ammonium citrate, diammonium phosphate, magnesium chloride, amine salts of p-toluene sulfonic acid and mixtures thereof.

2. The composition of claim 1 wherein said polymer further comprises, as polymerized units, 99–71%, by weight based on dry polymer weight, of one or more second monomer(s) having a weight-averaged water solubility of less than 1.8% by weight; and from 0–19%, by weight based on dry polymer weight, of one or more third monomer(s) having a water solubility of greater than 6% by weight.

3. The composition of claim 1 or claim 2 wherein when said ink composition comprises one or mare ingredients, other than said emulsion polymer and said pigment, said ingredient(s) having greater than 20%, on an equivalents basis, hydroxy, amino, or thiol functionality relative to the amount of hydroxy functionality in said emulsion polymer, said ingredients each have a boiling point less than 220° C.

4. A method for improving the durability of inkjet ink printed on a substrate comprising:
   (a) forming an inkjet ink composition comprising a liquid medium; a pigment; an emulsion polymer, said polymer comprising as polymerized units 1–10%, by weight based on dry polymer weight, of a first monomer selected from the group consisting of methylol acrylainide, methylol methaerylaniide, methyl acrylamidoglycolate methyl ether, acrylainidoglycolic acid, and mixtures thereof; and a latent acid catalyst composition at 0.1% to 10% by weight of the inkjet ink, wherein the latent acid catalyst composition is selected from the group consisting of ammonium chloride, ammonium nitrate, ammonium citrate, diammonium phosphate, magnesium chloride, amine salts of p-toluene sulfonic acid and mixtures thereof;
   (b) printing said composition on a substrate; and
   (c) curing said composition.

5. The method according to claim 4 wherein said polymer further comprises, as polymerized units, 99–71%, by weight based on dry polymer weight, of one or more second monomer(s) having a weight-averaged water solubility of less than 1.8% by weight; and from 0–19%, by weight based on dry polymer weight, of one or more third monomer(s) having a water solubility of greater than 6% by weight.

6. The method according to claim 4 or claim 5 wherein when said ink composition comprises one or more ingredients, other than said emulsion polymer and said pigment, said ingredient(s) having greater than 20%, on an equivalents basis, hydroxy, amino, or thiol functionality relative to the amount of hydroxy functionality in said emulsion polymer, then said ingredients each have a boiling point less than 220° C.

* * * * *